(12) United States Patent
Coman

(10) Patent No.: US 9,460,141 B1
(45) Date of Patent: Oct. 4, 2016

(54) AUTOMATIC EXPIRING OF CACHED DATA

(71) Applicant: Google Inc., Mountain View, CA (US)

(72) Inventor: Alexandru Adrian Coman, Waterloo (CA)

(73) Assignee: Google Inc., Mountain View, CA (US)

( * ) Notice: Subject to any disclaimer, the term of this patent is extended or adjusted under 35 U.S.C. 154(b) by 315 days.

(21) Appl. No.: 14/010,412

(22) Filed: Aug. 26, 2013

Related U.S. Application Data

(60) Provisional application No. 61/701,559, filed on Sep. 14, 2012.

(51) Int. Cl.
*G06F 12/00* (2006.01)
*G06F 17/30* (2006.01)

(52) U.S. Cl.
CPC ... *G06F 17/30345* (2013.01); *G06F 17/30008* (2013.01); *G06F 17/3089* (2013.01)

(58) Field of Classification Search
CPC .................. G06F 17/3089; G06F 17/30008
USPC .................................................. 711/161–162
See application file for complete search history.

(56) References Cited

U.S. PATENT DOCUMENTS

| | | | |
|---|---|---|---|
| 2005/0187982 A1* | 8/2005 | Sato | 707/200 |
| 2006/0256130 A1* | 11/2006 | Gonzalez | 345/619 |
| 2007/0156985 A1* | 7/2007 | Tsai | G06F 11/1435 711/162 |

* cited by examiner

*Primary Examiner* — Matthew Bradley
(74) *Attorney, Agent, or Firm* — McDermott Will & Emery LLP

(57) ABSTRACT

A method includes determining a time shift for data validity windows corresponding to a user, receiving a request for an incremental data update from the user, the user having cached data, determining that the request for the incremental data update is received within an unexpired data validity window for the cached data, wherein the data validity window is based on the determined time shift and in a case the incremental data update is received within the unexpired data validity window for the user, determining that the user is eligible for the incremental data update.

26 Claims, 5 Drawing Sheets

AUTOMATIC EXPIRING OF CACHED DATA

CROSS-REFERENCE TO RELATED APPLICATIONS

The present application claims the benefit of priority under 35 U.S.C. §119 from U.S. Provisional Patent Application Ser. No. 61/701,559, filed on Sep. 14, 2012, the disclosure of which is hereby incorporated by reference in its entirety for all purposes.

BACKGROUND

Updating cached client data on a mobile device takes up significant network resources when large amounts of data are sent from a server to a mobile device.

SUMMARY

The subject disclosure relates generally to data management, and more particularly to incremental data updates to data cached at a user.

The subject disclosure relates to a machine-implemented method that includes determining a time shift for data validity windows corresponding to a user, receiving a request for an incremental data update from the user, the user having cached data, determining that the request for the incremental data update is received within an unexpired data validity window for the cached data, wherein the data validity window is based on the determined time shift and in a case the incremental data update is received within the unexpired data validity window for the user, determining that the user is eligible for the incremental data update.

These and other aspects may include one or more of the following features. Determining that the user is eligible for the incremental data update when the incremental data update is received within the unexpired data validity window for the cached data may include providing the incremental data update to the user. Providing the incremental data update to the user may include identifying new data for the incremental data update and transmitting the identified new data to the user. Identifying new data for the incremental data update may include determining a change to server data corresponding to the user by comparing the cached data stored on the user to server data corresponding to the user, wherein new data for the incremental data update is a difference between the server data corresponding to the user and the cached data stored on the user.

Providing the incremental data update to the user may further include identifying a maximum number of incremental data updates for the data validity window and determining whether the maximum number of incremental data updates have been provided to the user during the data validity window. When the maximum number of incremental data updates have been provided to the user for a particular data validity window, automatically expiring the cached data stored on the user.

Providing the incremental data update to the user may also include identifying a maximum number of incremental data updates for the user and determining whether the maximum number of incremental data updates for the user have been provided to the user. When the maximum number of incremental data updates have been provided to the user, automatically expiring the cached data stored on the user.

Determining that the user is not eligible for the incremental data update may further include determining that the cached data stored on the user is expired and replacing the expired cached data stored on the user with full client data. Replacing the expired cached data stored on the user with the full client data may include causing the user to delete the expired cached data and transmitting the full client data to the user.

Replacing the expired cached data stored on the user with full client data may include identifying a new data validity window.

The time shift associated with the user is computed based at least on an identifier of the user. The time shift associated with the user may be predetermined. The data validity window for the user may be predetermined in at least one of a previous request for an incremental data update from the user resulting in replacing the expired cached data stored on the user with full client data, or a previous request for new full data update from the user.

The method may further include identifying a time when the request is received. Determining whether the request for the incremental data update is received within the unexpired data validity window for a user may include identifying a validity window that is unexpired at the time the request is received.

The subject disclosure also relates to a machine-readable medium with instructions stored therein, which when executed by the processors, cause the processors to perform operations that include determining a time shift for modifying a start and end time of a data validity window for cached data stored on a user, receiving a request for an incremental data update from the user, the request comprising a first token identifying a previously determined first validity window for the cached data stored on the user, wherein the first validity window is modified with the determined time shift and identifying, based on a time when the request is received from the user, a second token that is current at the server for the user when the request for the incremental data update is received, wherein the second token identifies a predetermined second validity window modified with the determined time shift. The operations also include comparing the first token to the second token to determine whether the first token matches the second token, wherein, the first token is determined to be valid when the first data validity window in the first token matches the second validity window of the second token and providing the incremental data update to the user in a case where the first token is valid, otherwise in a case the first token is not valid, determining that the cached data on the user is expired and replacing the expired cached data with full client data and a replacement first token.

These and other aspects may include one or more of the following features. The first token may be valid when the received first token matches the second token that is in effect at the server for the identified user, when the request for the incremental data update is received. Replacing the expired cached data stored on the user with full client data and a new first token may include determining a new data validity window for the user and generating the replacement first token corresponding to the determined new data validity window for the user.

The first token may be predetermined in at least one of a previous request for an incremental data update from the user resulting in replacing the expired cached data stored on the user with full client data, or a previous request for new full data update from the user.

Replacing the expired cached data with full client data and a new first token may include causing the user to delete the expired cached data and first token and transmitting the full client data and the replacement first token to the user.

Determining the time shift for modifying a start and end time of a data validity window for data cached on a user may include modifying a start and end time of a data validity window for the identified identifier according to the determined data validity window time shift.

Providing the incremental data update to the user may include identifying new data for the incremental data update and transmitting the identified new data to the user.

Identifying new data for the incremental data update may include determining a change to server data corresponding to the user by comparing the cached data stored on the user to server data corresponding to the user. The incremental data update may include a difference between the server data corresponding to the user and the cached data stored on the user.

The disclosure also provides a system that includes a request module configured to receive a request for an incremental data update from a user with cached data, an identification module configured to identify one or more of the requesting user, a time when the request for incremental update is received, and an unexpired data validity window for the cached data, wherein the data validity window is based on a pre-determined time shift for data validity windows corresponding to the user and a validation module configured to determine whether the requesting user is eligible for the incremental data update. The system also includes an update module configured to provide the incremental data update to the user in a case where the requesting user is eligible for the incremental data update, otherwise, to determine that the cached data stored on the user is expired and replace the expired cached data stored on the user with full client data.

The system may also include a token module, configured to determine a data validity window time shift for the user and modify a start and end time of data validity windows for the user according to the determined data validity window time shift.

These and other aspects may provide one or more of the following advantages. A mobile client running an application for which cached data is stored will receive full client data at a client-specific data update window, thereby reducing the amount of data transferred over a network between a server and users. Full data fetching is more uniformly distributed at a server, when updates for users requiring full new data are spread out more evenly. Cached data validity windows may be set by the system according to an identifier associated with a user.

It is understood that other configurations of the subject technology will become readily apparent from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several implementations of the subject technology are set forth in the following figures.

DETAILED DESCRIPTION

Figure 1:
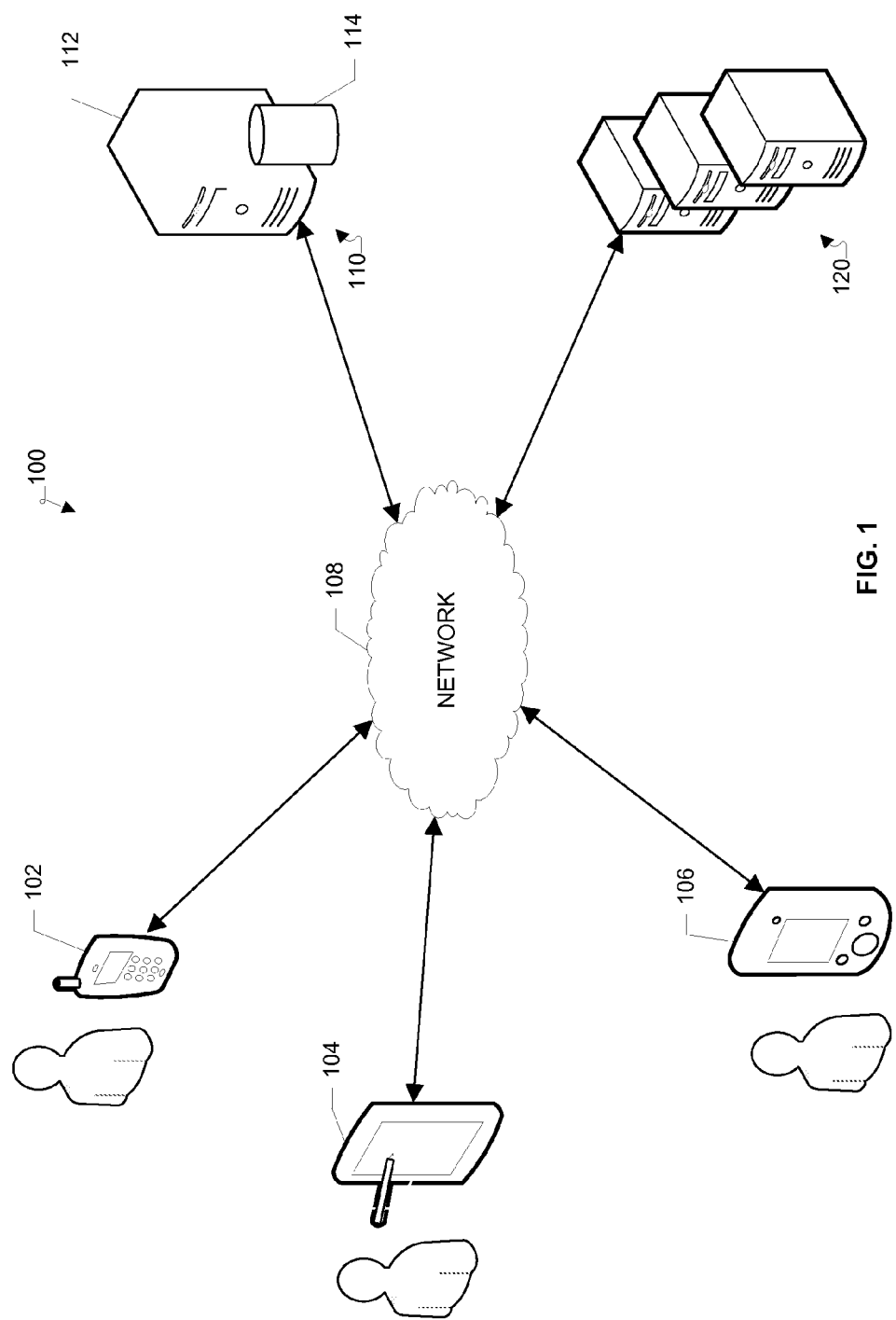
FIG. 1 is a diagram of an exemplary system for automatically expiring cached data stored on a client device.

In the following detailed description, numerous specific details are set forth to provide a full understanding of the present disclosure. It will be apparent, however, to one ordinarily skilled in the art that the configurations of the present disclosure may be practiced without some of these specific details. In other instances, well-known structures and techniques have not been shown in detail so as not to obscure the disclosure.

According to various aspects of the subject technology, methods and systems for automatically expiring cached data are provided. Incremental data update protocols for updating cached client data may be implemented to help avoid overburdening the networks. However, newly updated data may be in a format that is inconsistent or incompatible with the cached data, thereby degrading the user experience. Also, when stale records are cached on a client device, after a change in server data is detected and an incremental data update is performed, duplicate records may be created on the mobile client device, leading to potential communication errors. Therefore, periodic full data uploads are implemented, where a client device receives full client data from a server.

Periodic full data uploads, however, require a lot of network resources because of the large amounts of data that is transferred between a server and one or more client devices. To avoid overburdening the networks, periodic full data uploads are staggered and performed according to identifier-based data validity window time shifts. That is, each client device (associated with a unique identifier) or a group of client devices receives a full data upload at a different time. Each user or a group of users' data validity window starts and ends at a different time, according to a predetermined time shift.

The system may calculate a default data validity window, based on the beginning of Unix time. The default data validity window thus defines an interval for data validity and may last 27 or 30 days, for example. That is, by default, cached data may be deemed valid for 27 or 30 days, which is the data validity window. To prevent a need for updating cached data on all participating client devices at the same time, for example, on the last day of the default data validity window, the start of a data validity window is shifted for each client device, based on the identifier associated with the client device. Specifically, while the data validity window for some users may start on the first day of a the default data validity window, for others, the start may be on the 9th or 12th day of the default validity window, resulting in different data validity windows for each client device or a group of client devices. Although each validity window has the same duration (e.g., 27 or 30 days), the beginning and end days are shifted.

For each user, the system computes a data validity window shift. The data validity window shift is computed such that, a unique data validity window is computed for each user or a group of users. For example, an identifier may be divided by an arbitrary value, for example, 27 or 30 (duration of a data validity window). The remainder value may dictate the shift value. A user's identifier may be any unique identifier of a user or an electronic device operated by a user.

Alternatively, each user's data validity window start and end day may be computed such that, users whose identifiers end with a "0" have a data validity window "X+0 days" (where "X" is the default data validity window calculated from the start of Unix time). That is, for identifiers ending with a "0," the validity windows may start on the first day of the default data validity window "X." Users whose identifiers end with a "1," may have data validity windows that start at "X+3 days," that is, their validity windows are shifted by 3 days and start 3 days after the default validity window "X." Users whose identifiers end with a "2" may have data validity windows that start at "X+6 days," . . . users whose identifiers end with an "8" may have data validity windows that start at "X+24 days," and so on, up to a maximum shift of 27 or 30, depending on the range of the default validity window "X." The shift may not be larger than the default data validity window "X." Determining a unique start and end time for a data validity window for each client device or a group of client devices provides for more uniformly distributed invalidation and updates of cached data. As such, data validity windows are determined based on system time, duration of a validity window and the identifier-based shift.

The disclosed subject matter provides a method for automatically expiring cached data stored on a client device. When a client device calls up a server and requests full client data, the server responds with an instruction to receive full client data and invalidates the old cached data. However, when a request for an incremental data update is received at a client device, the server decides whether to grant the incremental data update or to instruct the client device to expire the cached data.

According to an aspect of the disclosed technology, when a client device calls up a server with a request for an incremental data update, the server determines whether the request for the incremental data update is received within an unexpired data validity window for the cached data. The data validity window is based on a pre-determined time shift for data validity windows corresponding to a identifier associated with the client device. When the incremental data update is received within the unexpired data validity window for the identifier associated with the client device, the system determines that the client device is eligible for the incremental data update and provides the incremental data update to the requesting client device. Otherwise, the system determines that the client device is not eligible for the incremental data update.

According to an aspect of the disclosed technology, determining whether the request for the incremental data update is received within an unexpired data validity window for the cached data may be implemented by identifying a time when the request is received and identifying the validity window that is unexpired at the time the request is received.

According to another aspect of the disclosed subject matter, a method for automatically expiring cached data stored on a client device includes receiving at a server, a request for an incremental data update from a client device. The request may include a first token that identifies a previously determined validity window for the cached data stored on the client device. The validity window is modified with a time shift which is computed by the system. Such token is herein referred to as a client data token.

The client data token may be provided to the client by the server during a previous full client data upload. When a server provides a full client data upload to a client device, the server may send to a client device a sync token, which includes information on a data validity window associated with the data sent to the client device. The data validity window is associated with the identifier of the client device. The validity window sent to the client device is shifted by the system prior to being sent to the client device, and no further shifting is required.

The system also identifies the identifier of the requesting client device and a token that is current at the server for the identified identifier. Such token is herein referred to as a server token. The server token identifies a predetermined validity window that, similarly to the client data token, is modified with the time shift. However, the server token is identified based on the time when the request is received from the client device. The system compares the client data token to the server token to determine whether the client data token matches the server token. The system may also check whether the data validity window identified in the client data token matches the data validity window in the server token. The system determines that the cached data stored on the client is unexpired when the client data token matches the server token. The system further determines that the client device is eligible for an incremental data update and provides the incremental data update to the client device.

The incremental data update comprises a set of client data that is less than the full client data. Providing the incremental data update to the client device includes identifying data for the incremental data update and transmitting the identified data to the client device. Identifying data for the incremental data update includes determining a change to server data corresponding to the identifier, by comparing the cached data stored on the client device to the server data corresponding to the identifier. Data that is transmitted to the client as part of the incremental data update may be data that is the difference between the server data and the cached data stored on the client device.

When the client data token does not match the server token, the system determines that the client device is not eligible for the incremental data update. The system further determines that the cached data stored on the client device is expired and replaces the expired cached data with full client data and sends a replacement client data token to the client device.

When replacing the expired cached data stored on the client device with full client data and a replacement client data token, the server identifies the server data validity window that is current at the server when the full client data is sent to the client device and generates a replacement first token corresponding to the identified server data validity window. The replacement client data token is sent to the client device along with the full client data. The system causes the client device to delete the expired cached data and the client data token and transmits the full client data and the replacement client data token to the client device.

FIG. 1 illustrates an example client-server network which provides for automatically expiring cached data. A network display 100 includes a number of electronic devices 102, 104 and 106 communicably connected to a server 110 by a network 108. Server 110 includes a processing device 112 and a data store 114. Processing device 112 executes computer instructions stored in data store 114, for example, instructions to determining whether a request for the incremental data update is received within an unexpired data validity window for a client device's cached data and to calculate a identifier-based data validity window shift. Data store 114 may store information pertaining to, for example, a validity window shift for each identifier and other preferences and settings.

Servers 110 or application servers 120 may host an application within which some of the processes discussed herein are implemented. In some example aspects, electronic devices or client devices, as used interchangeably herein, 102, 104 and 106 can be computing devices such as smartphones, PDAs, portable media players, tablet computers, televisions or other displays with one or more processors coupled thereto or embedded therein, or other appropriate computing devices that can be used for running a mobile application.

Electronic devices 102-106 may have one or more processors embedded therein or attached thereto, or other appropriate computing devices that can be used for accessing a host, such as server 110. In the example of FIG. 1, electronic device 102 is depicted as a smartphone, electronic device 104 is depicted as a tablet computer, and electronic device 106 is depicted as a PDA. A client is an application or a system that accesses a service made available by a server which is often (but not always) located on another computer system accessible by a network. Some client applications may be hosted on a website, whereby a browser is a client. Such implementations are within the scope of the subject disclosure, and any reference to client may incorporate a browser and reference to server may incorporate a website.

The system (e.g., hosted at server 110), detects a request from a client device to receive an incremental data update to the client device's cached data. Upon detecting the incremental data update request, the server determines whether the cached data at the client device is valid or needs to be replaced with full new cached data. The determination may be made by determining whether the request for the incremental data update is received within an unexpired data validity window for the cached data. The data validity window is based on a pre-determined time shift for data validity windows corresponding to a identifier associated with the client device.

Each time the client device receives a set of full client data, a token identifying a data validity window for that data may be sent by the server 110 or application servers 120 to the client device. The client device holds on to the token until the client makes a request for an incremental data update. When the client device calls up a server, such as server 110 or application servers 120, for an incremental data update, the client device transmits, with the request, the token previously sent to the client by the server.

Application servers 120 may also calculate a shift in a start and end time of a data validity window for a particular identifier. Application servers may thus pre-determine, for each identifier, the shift and a schedule of data validity window start and end times. The shifts may be calculated once, or may be continuously calculated and changed to help alleviate network traffic.

Application servers 120 are in communication with the electronic devices 102-106 through network 108. Each electronic device 102-106 may be a client device or a host device. In some example aspects, server 110 can be a single computing device such as a computer server. In other configurations, server 110 can represent more than one computing device working together to perform the actions of a server computer (e.g., cloud computing). The server 110 may host the web server communicationally coupled to the browser at the client device (e.g., electronic devices 102, 104 or 106) via network 108.

The network 108 can include, for example, any one or more of a personal area network (PAN), a local area network (LAN), a campus area network (CAN), a metropolitan area network (MAN), a wide area network (WAN), a broadband network (BBN), the Internet, and the like. Further, the network 108 can include, but is not limited to, any one or more of the following network topologies, including a bus network, a star network, a ring network, a mesh network, a star-bus network, tree or hierarchical network, and the like.

Figure 2:
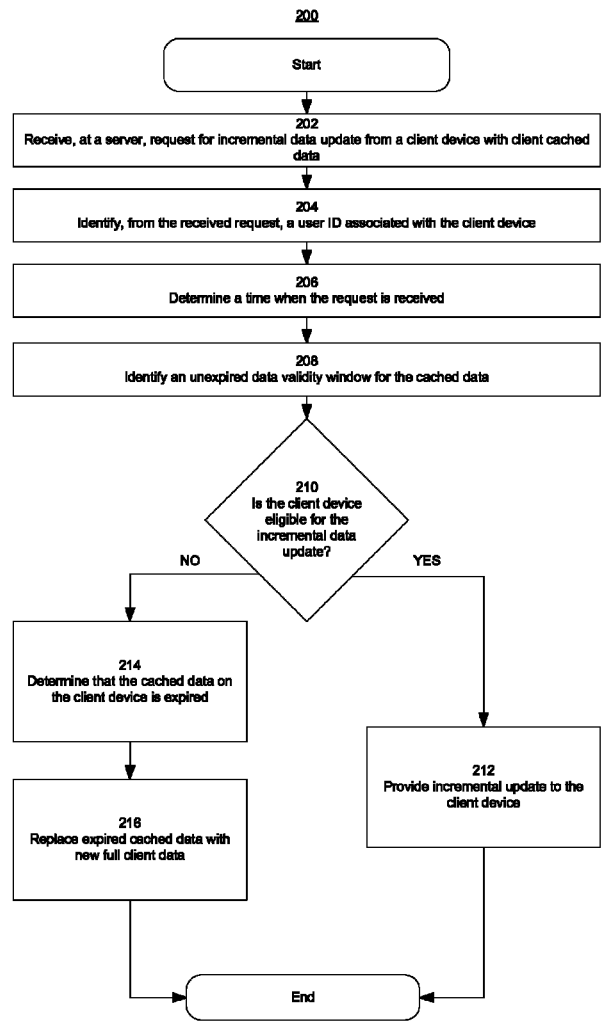
FIG. 2 illustrates a flow diagram of an example process for automatically expiring cached data stored on a client device.

FIG. 2 illustrates a flow diagram of an example process 200 for automatically expiring cached data. Process 200 begins and at block 202, a request is received from a client device for an incremental data update. The client device may be a mobile device that has stored on it cached data that corresponds to client data stored at a server, to which the incremental data update request is made.

In a case the client device makes a request for a full data update, the server issues a full data update and the process may end. However, incremental data updates are intended to replace less than the full client data stored at the server. Incremental data updates are better suited for communicating small data updates to a client device. Incremental data updates are also less burdensome on a network, because less data is transmitted from a server to a client. Occasionally, however, a device may send an incremental data update request to a server and receive back data that is incompatible with the other data at the client device. The new received data may be of a different format or may cause duplicate or inconsistent entries that may cause communication or other types of errors in operation of the client device. It is beneficial, therefore, for a server to periodically expire cached data, even when a client device makes a request for an incremental data update.

At block 204, the system identifies, from the received request for incremental data update received from the client device, an identifier associated with the client device. The system also identifies a time when the incremental data update request was received from the client device at block 206. The time, as used herein, means system time. Identifying the time allows the system to identify a validity window that is unexpired at the time the request is received.

At block 208, the system determines whether the request for the incremental data update is received within an unexpired data validity window for the cached data. The data validity window is based on a pre-determined time shift for data validity windows corresponding to an identifier associated with the client device. As previously discussed, the client data validity window is computed to include a time shift, whereby cached data at various client devices expires at different times and the networks are not overburdened with simultaneously transmitting large amounts of data from a server to a large number of client devices. Determining whether the request for the incremental data update is received within the unexpired data validity window for an identifier associated with the client device may further include identifying the validity window that is unexpired at the time the request is received.

When the incremental data update is received within the unexpired data validity window for the identifier associated with the client device, the system determines, at block 210, that the client device is eligible for the incremental data update and provides the incremental data update to the client device. The system may further identify data that has changed or has been added at the server, and send the changed or added data to the client device. Identifying data for the incremental data update may therefore include determining a change to server data corresponding to the identifier by comparing the cached data stored on the client device to the server data corresponding to the identifier. Data for the incremental data update may include a difference between the server data corresponding to the identifier and the cached data stored on the client device. The incremental data update is a set of data that is less than the full new client data the client device receives when the cached data is invalidated and the client device receives new full data.

When the incremental data update is not received within the unexpired data validity window for the identifier associated with the client device, the system determines that the client device is not eligible for the incremental data update. The system further determines that the cached data stored on the client device has expired at block 212. The system may further determine that the request for the incremental data update is denied and replace the expired cached data with full client data at block 214. The system may communicate to the client device that the incremental data update is unavailable and the request is denied. The system may further request permission to send full client data to the client device.

Replacing the expired cached data stored on the client device with the full client data may include causing the client device to delete the expired cached data and transmitting the full client data to the client device. Replacing the expired cached data stored on the client device with full client data may also include determining a new or replacement client data validity window for the identifier and transmitting information about the replacement client data validity window to the client device. The replacement client data validity window information may be transmitted together with the full client data.

According to an aspect of the disclosed technology, additional factors may contribute to denying a request for an incremental data update. For example, a maximum number of incremental data updates for a data validity window may be implemented, whereby when the maximum number of incremental data updates have been provided to the client device during the same data validity window, the cached data stored on the client device is automatically invalidated. Alternatively, a maximum number of incremental data updates for the client device regardless of the data validity window may be implemented, whereby when the maximum number of incremental data updates for the client device have been provided to the client device, the system automatically expires and invalidates the cached data stored on the client device.

Figure 3:
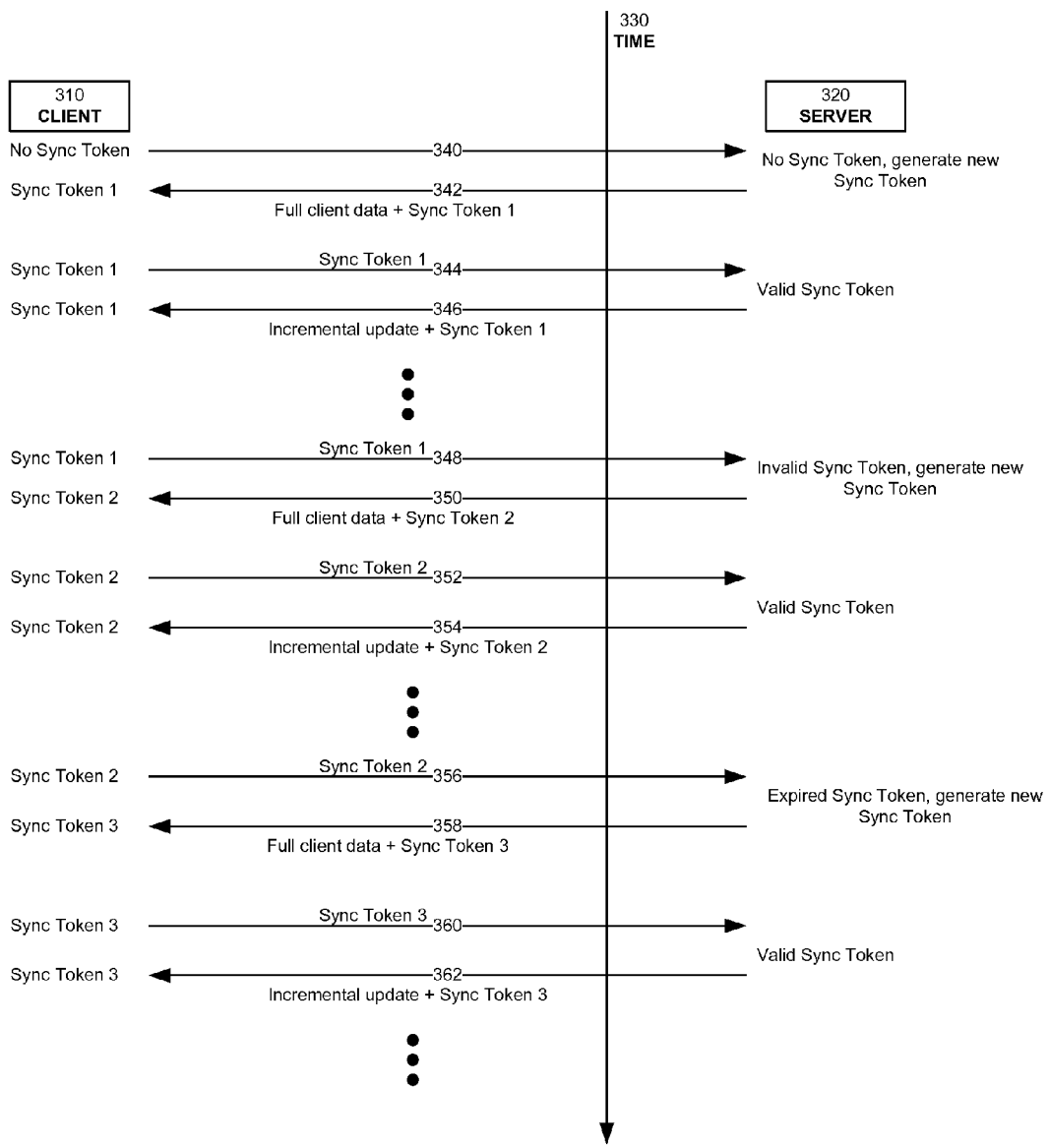
FIG. 3 conceptually illustrates a diagram of an example process for automatically expiring cached data stored on a client device according to an aspect of the subject technology.

FIG. 3 conceptually illustrates a diagram of an example process 300 for automatically expiring cached data according to an aspect of the subject technology. Specifically, FIG. 3 illustrates an example sync flow. A client 310 and a server 320 are illustrated. The client 310, any type of a client device described in FIG. 1, periodically calls up a server 320 (e.g., server 110 or application servers 120) to sync data (i.e., request an incremental data update). A series of communications 340-362 are illustrated as arrows between client 310 and server 320. A time factor 330 is kept throughout each of the communications 340-362. The time, as used herein, is system time.

As illustrated, the process 300 begins with client 310 sending a first communication 340 to server 320. The first communication 340 is a first request for full client data and does not include a sync token. The sync token includes, but is not limited to, client data validity window information for client 310. Such information is based at least on a data validity window time shift specific to client 310. The sync token may likewise include other information, such as client data version, type, last full data update information, etc. Server 320 determines that client 310 did not provide a sync token and generates sync token 1 for client 310. Server 320 sends the sync token 1 and the full client data to client 310 in communication 342.

The sync token 1 may, therefore, be determined in a request for an incremental data update resulting in replacing the expired cached data stored on the client 310 with full client data, or a previous request for new full data update from the client 310.

When client 310 calls up the server for an incremental data update the next time (e.g., communication 344), server 320 analyzes the sync token according to examples described with reference to FIG. 2, and, if server 320 determines that the sync token 1 is unexpired (i.e., valid), the server 320 sends sync token 1 back to the client, along with an incremental data update, in communication 346. As discussed previously, a token is deemed unexpired or valid when the client data validity window in the sync token matches the server data validity window that is associated with client 310 and current at server 320 at the time the sync request (e.g., communication 344) was sent by client 310 to server 320.

Several more communications may take place between the client 310 and server 320, until the token is invalidated, as in illustrated in reference to communication 348. The sync token may be invalidated when the client data validity window in the sync token does not match the server data validity window that is associated with client 310 and current at server 320 at the time server 320 receives communication 348 from client 310. When server 320 determines that the sync token is invalid or expired, the server 320 generates a new or replacement token, sync token 2, and sends the new or replacement token along with full client data to client 320. While sync token 2 is valid and unexpired, the client 310 may request and receive several additional incremental data updates, until sync token 2 expires and the server 320 generates a new sync token 3. As illustrated, sync token 3 is generated when client 310 receives full client data.

Replacing the expired cached data stored on the client device with full client data and a new token may include determining a new client data validity window for the identifier associated with the requesting client 310 and generating the replacement token corresponding to the new client data validity window for the identifier of the client 310. Replacing the expired cached data with full client data and a new token may include causing the client 310 to delete the expired cached data and token and transmitting the full client data and the new sync token to the client device.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing display. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 4:
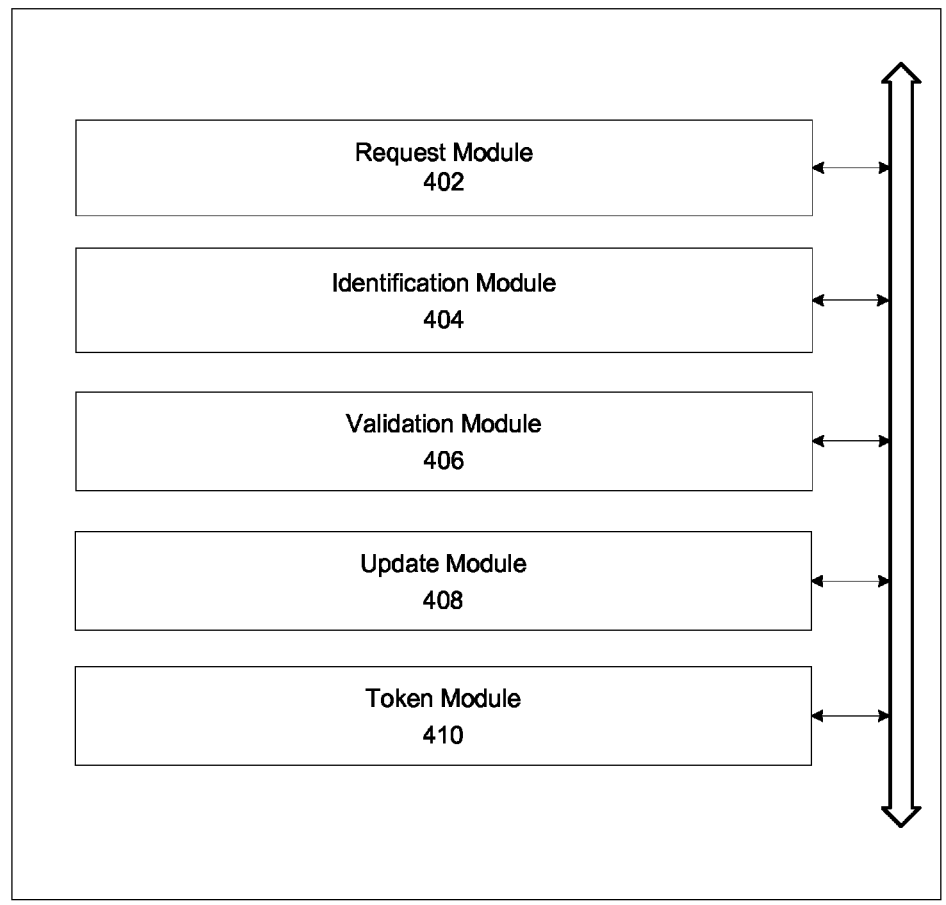
FIG. 4 conceptually illustrates an example of a system for automatically expiring cached data.

FIG. 4 illustrates an example of system 400 for automatically expiring cached data, in accordance with various aspects of the subject technology. System 400 comprises a request module 402, an identifier module 404, a validation module 406, an update module 408, and a token module 410.

The request module 402 is configured to receive a request for an incremental data update from a user with cached data.

The identifier module 404 is configured to identify one or more of the requesting user, a time when the request for incremental update is received, and an unexpired data validity window for the cached data, wherein the data validity window is based on a pre-determined time shift for data validity windows corresponding to the user.

The validation module 406 is configured to determine whether the requesting user is eligible for the incremental data update The update module 408 is configured to provide the incremental data update to the user in a case where the requesting user is eligible for the incremental data update, otherwise, to determine that the cached data stored on the user is expired and replace the expired cached data stored on the user with full client data.

The token module 410 is configured to determine a data validity window time shift for the user and modify a start and end time of data validity windows for the user according to the determined data validity window time shift.

These modules may be in communication with one another. In some aspects, the modules may be implemented in software (e.g., subroutines and code). In some aspects, some or all of the modules may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure.

Figure 5:
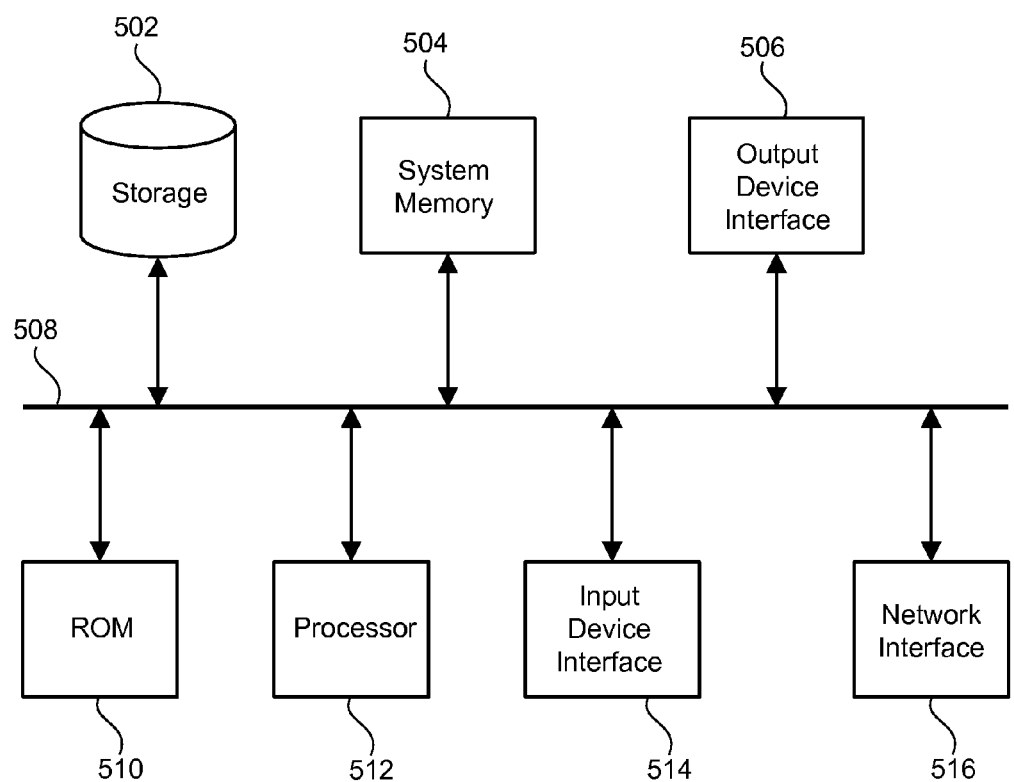
FIG. 5 conceptually illustrates an electronic system with which some aspects of the subject technology are implemented.

FIG. 5 conceptually illustrates an electronic system with which some aspects of the subject technology are implemented. Electronic system 500 can be a server, computer, phone, PDA, laptop, tablet computer, television with one or more processors embedded therein or coupled thereto, or any other sort of electronic device. Such an electronic system includes various types of computer readable media and interfaces for various other types of computer readable media. Electronic system 500 includes a bus 508, processing unit(s) 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such a random access memory. System memory 504 stores some of the instructions and data that the processor needs at runtime. In some implementations, the processes of the subject disclosure are stored in system memory 504, permanent storage device 502, and/or ROM 510. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interfaces 506 enables, for example, the display of images generated by the electronic system 500. Output devices used with output device interface 506 include, for example, printers and display devices, such as televisions or other displays with one or more processors coupled thereto or embedded therein, or other appropriate computing devices that can be used for running an application. Some implementations include devices such as a touch screen that functions as both input and output devices.

Finally, as shown in FIG. 5, bus 508 also couples electronic system 500 to a network (not shown) through a network interface 516. In this manner, the computer can be a part of a network of computers (such as a local area network ("LAN"), a wide area network ("WAN"), or an Intranet, or a network of networks, such as the Internet. Any or all components of electronic system 500 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a device having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Configurations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some configurations, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that some illustrated steps may not be performed. Some of the steps may be performed simultaneously. For example, in certain circumstances, multitasking and parallel processing may be advantageous. Moreover, the separation of various system components in the configurations described above should not be understood as requiring such separation in all configurations, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa.

Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A computer-implemented method comprising:
    determining a time shift for adjusting a start time and an end time of a predetermined data validity window corresponding to a client device;
    receiving a request from the client device for an incremental data update, the client device having cached data;
    determining that the request for the incremental data update is received within an unexpired data validity window for the cached data, wherein the unexpired data validity window is the predetermined data validity window with the start time and the end time adjusted by the determined time shift; and
    determining that the client device is eligible for the incremental data update based on the request being received within the unexpired data validity window.

2. The method of claim 1, further comprising:
    providing the incremental data update to the client device.

3. The computer-implemented method of claim 2, wherein providing the incremental data update to the client device comprises:
    identifying new data for the incremental data update; and
    transmitting the identified new data to the client device.

4. The computer-implemented method of claim 3, wherein identifying new data for the incremental data update comprises determining a change to server data corresponding to the client device by comparing the cached data stored on the client device to server data corresponding to the client device, wherein new data for the incremental data update comprises a difference between the server data corresponding to the client device and the cached data stored on the client device.

5. The computer-implemented method of claim 2, wherein providing the incremental data update to the client device further comprises:
    identifying a maximum number of incremental data updates for the predetermined data validity window; and
    determining whether the maximum number of incremental data updates have been provided to the client device during the predetermined data validity window, wherein, in a case where the maximum number of incremental data updates have been provided to the client device during the predetermined data validity window, automatically expiring the cached data stored on the client device.

6. The computer-implemented method of claim 2, wherein providing the incremental data update to the client device further comprises:
    identifying a maximum number of incremental data updates for the client device; and
    determining whether the maximum number of incremental data updates for the client device have been provided to the client device, wherein, in a case where the maximum number of incremental data updates have been provided to the client device, automatically expiring the cached data stored on the client device.

7. The computer-implemented method of claim 1, wherein determining that the client device is not eligible for the incremental data update further comprises:
    determining that the cached data stored on the client device is expired; and
    replacing the expired cached data stored on the client device with full client data.

8. The computer-implemented method of claim 7, wherein replacing the expired cached data stored on the client device with the full client data comprises:
    causing the client device, to delete the expired cached data; and
    transmitting the full client data to the client device.

9. The computer-implemented method of claim 8, wherein replacing the expired cached data stored on the client device with full client data comprises identifying a new data validity window.

10. The computer-implemented method of claim 1, wherein the time shift associated with the client device is computed based at least on an identifier of the client device.

11. The computer-implemented method of claim 1, wherein the time shift associated with the client device is predetermined.

12. The computer-implemented method of claim 1, wherein the predetermined data validity window for the client device is predetermined in at least one of a previous request for an incremental data update from the client device resulting in replacing expired cached data stored on the client device with full client data; or a previous request for new full data update from the client device.

13. The computer-implemented method of claim 1, further comprising:
    identifying a time when the request is received, the time being within the unexpired data validity window.

14. The computer-implemented method of claim 13, wherein determining whether the request for the incremental data update is received within the unexpired data validity window comprises determining that the predetermined data validity window is unexpired at the time the request is received.

15. A non-transitory machine-readable medium comprising instructions stored therein, which when executed by one or more processors, cause the one or more processors to perform operations comprising:

determining a time shift for modifying a start and end time of a data validity window for cached data stored on a client device;

receiving a request for an incremental data update from the client device, the request comprising a first token identifying a previously determined first validity window for the cached data stored on the client device, wherein the first validity window is modified with the determined time shift;

identifying, based on a time when the request is received from the client device, a second token that is current at a server for the client device when the request for the incremental data update is received, wherein the second token identifies a predetermined second validity window modified with the determined time shift;

comparing the first token to the second token to determine whether the first token matches the second token, wherein, the first token is determined to be valid when the first data validity window in the first token matches the second validity window of the second token; and providing the incremental data update to the client device in a case where the first token is valid, otherwise in a case the first token is not valid, determining that the cached data on the client device is expired and replacing the expired cached data with full client data and a replacement first token.

16. The non-transitory machine-readable medium of claim 15, wherein the first token is valid when the first token matches the second token that is in effect at the server for the client device, when the request for the incremental data update is received.

17. The non-transitory machine-readable medium of claim 15, wherein replacing the expired cached data stored on the client device with full client data and a new first token comprises:

determining a new data validity window for the client device; and generating the replacement first token corresponding to the determined new data validity window for the client device.

18. The non-transitory machine-readable medium of claim 15, wherein the first token is predetermined in at least one of a previous request for an incremental data update from the client device resulting in replacing the expired cached data stored on the client device with full client data, or a previous request for new full data update from the client device.

19. The non-transitory machine-readable medium of claim 15, wherein replacing the expired cached data with full client data and a new first token comprises:

causing the client device to delete the expired cached data and first token; and transmitting the full client data and the replacement first token to the client device.

20. The non-transitory machine-readable medium of claim 15, further comprising modifying the start and end time of the first validity window for the client device according to the determined time shift.

21. The non-transitory machine-readable medium of claim 20, wherein providing the incremental data update to the client device comprises:

identifying new data for the incremental data update; and transmitting the identified new data to the client device.

22. The non-transitory machine-readable medium of claim 21, rein identifying new data for the incremental data update comprises determining a change to server data corresponding to the client device by comparing the cached data stored on the client device to server data corresponding to the client device, wherein data for the incremental data update comprises a difference between the server data corresponding to the client device and the cached data stored on the client device.

23. A system comprising:

a request module configured to receive a request for an incremental data update from a requesting client device with cached data;

an identifier module configured to identify one or more of the requesting client device, a time when the request for incremental update is received, and an unexpired data validity window for the cached data, wherein the unexpired data validity window is adjusted based on a pre-determined time shift for adjusting data validity windows corresponding to the requesting client device;

a validation module configured to determine whether the requesting client device is eligible for the incremental data update;

an update module configured to provide the incremental data update to the requesting client device in a case where the requesting client device is eligible for the incremental data update, otherwise, to determine that the cached data stored at the requesting client device is expired and replace the expired cached data stored at the requesting client device with full client data; and a token module configured to determine a data validity window time shift for a client device and to modify a start and an end time of a data validity window for the cached data based on the data validity window time shift.

24. The method of claim 1, wherein the client device is provided with a client data validity window in a client token associated with a data upload prior to the request being sent from the client device, the client data validity window being the predetermined data validity window with the start time and the end time adjusted by the determined time shift.

25. The method of claim 24, wherein the request includes the client token provided to the client device, wherein determining that the client device is eligible for the incremental data update comprises:

comparing the client token to a server token to determine a match, the server token including the unexpired data validity window; and determining that the client token is valid based on a match between the client token and the server token, wherein the client device is determined eligible based on the client token being determined valid.

26. The method of claim 25, wherein comparing the client token to the server token comprises:

comparing the client data validity window in the client token to the unexpired data validity window in the server token, wherein the client device is determined eligible based on a match between the client data validity window and the unexpired data validity window.

\* \* \* \* \*